United States Patent
Kjaer et al.

(10) Patent No.: US 9,429,164 B2
(45) Date of Patent: Aug. 30, 2016

(54) ROTOR FOR A CANNED MOTOR

(75) Inventors: Oluf Kjaer, Bjerringbro (DK); Finn Mathiesen Hoj, Arhus N (DK); Helge Grann, Bjerringbro (DK); Kare Iversen, Langa (DK)

(73) Assignee: Grundfos Management a/s, Bjerringbro (DK)

( * ) Notice: Subject to any disclaimer, the term of this patent is extended or adjusted under 35 U.S.C. 154(b) by 230 days.

(21) Appl. No.: 12/808,306

(22) PCT Filed: Dec. 3, 2008

(86) PCT No.: PCT/EP2008/010204
§ 371 (c)(1),
(2), (4) Date: Jun. 15, 2010

(87) PCT Pub. No.: WO2009/077076
PCT Pub. Date: Jun. 25, 2009

(65) Prior Publication Data
US 2010/0272591 A1   Oct. 28, 2010

(30) Foreign Application Priority Data

Dec. 17, 2007 (EP) .................................... 07024376

(51) Int. Cl.
| | |
|---|---|
| *F04D 29/043* | (2006.01) |
| *H02K 1/27* | (2006.01) |
| *H02K 1/28* | (2006.01) |
| *H02K 5/128* | (2006.01) |

(Continued)

(52) U.S. Cl.
CPC ............ *F04D 29/043* (2013.01); *F04D 13/064* (2013.01); *F04D 13/0626* (2013.01); *F04D 13/0633* (2013.01); *H02K 1/2726* (2013.01); *H02K 1/28* (2013.01); *H02K 5/128* (2013.01); *H02K 7/003* (2013.01)

(58) Field of Classification Search
CPC ......... H02K 1/27; H02K 1/2726; H02K 1/28; H02K 5/128; H02K 7/003; F04D 13/0626; F04D 13/0633; F04D 13/064; F04D 13/0666; F04D 29/041; F04D 29/043; F04D 29/047; F04D 29/0473; F04D 29/049; F04D 29/057; F04D 29/059; F04C 2240/54; F04C 2240/56; F04C 2240/52
USPC ...................... 417/423.1, 423.7, 423.12, 357; 310/156.11, 156.28, 156.23, 86, 43
See application file for complete search history.

(56) References Cited

U.S. PATENT DOCUMENTS

| | | | | |
|---|---|---|---|---|
| 3,114,323 | A | * | 12/1963 | Moser ....................... 417/423.12 |
| 3,292,549 | A | * | 12/1966 | Nicoll ........................... 417/359 |
| 3,572,982 | A | * | 3/1971 | Kozdon ...................... 417/423.7 |

(Continued)

FOREIGN PATENT DOCUMENTS

| | | | | |
|---|---|---|---|---|
| DK | WO 2006119843 A1 | * | 11/2006 | ............. F04B 17/03 |
| EP | 0899049 A1 | | 3/1999 | |

(Continued)

*Primary Examiner* — Devon Kramer
*Assistant Examiner* — Joseph Herrmann
(74) *Attorney, Agent, or Firm* — Panitch Schwarze Belisario & Nadel LLP

(57) ABSTRACT

A rotor (2) provided for a canned motor of a wet-running centrifugal pump forms the shaft for the drive of the impeller (7) and includes at least one permanent magnet (12) which is encapsulated in a fluid-tight manner. The peripheral part of the encapsulation in the region of the at least one permanent magnet (12) forms the rotor shaft.

10 Claims, 6 Drawing Sheets

(51) Int. Cl.
*H02K 7/00* (2006.01)
*F04D 13/06* (2006.01)

(56) References Cited

U.S. PATENT DOCUMENTS

| | | | | |
|---|---|---|---|---|
| 4,120,618 A | * | 10/1978 | Klaus | 417/420 |
| 4,433,261 A | * | 2/1984 | Nashiki et al. | 310/156.28 |
| 4,487,557 A | * | 12/1984 | Ruyak et al. | 417/420 |
| 4,667,123 A | * | 5/1987 | Denk et al. | 310/156.22 |
| 4,908,347 A | * | 3/1990 | Denk | 505/166 |
| 4,942,322 A | | 7/1990 | Raybould et al. | |
| 4,959,568 A | * | 9/1990 | Stokes | 310/51 |
| 5,044,897 A | * | 9/1991 | Dorman | 417/423.7 |
| 5,424,632 A | * | 6/1995 | Montagu | 324/146 |
| 5,649,362 A | * | 7/1997 | Yamamoto et al. | 29/895.21 |
| 5,711,657 A | * | 1/1998 | Hoffmeier | 417/319 |
| 6,229,240 B1 | * | 5/2001 | Kech et al. | 310/194 |
| 6,331,214 B1 | | 12/2001 | Koga et al. | |
| 6,365,998 B1 | * | 4/2002 | Kech et al. | 310/194 |
| 6,418,927 B1 | * | 7/2002 | Kullik | F04D 29/057 |
| | | | | 128/200.24 |
| 6,445,098 B1 | * | 9/2002 | Materne | 310/89 |
| 6,637,433 B2 | * | 10/2003 | Schob | 128/204.19 |
| 6,677,692 B1 | * | 1/2004 | Sato et al. | 310/89 |
| 6,841,912 B2 | * | 1/2005 | Yamada | F04D 25/0606 |
| | | | | 310/156.11 |
| 7,074,019 B2 | * | 7/2006 | Knoll | 417/423.14 |
| 7,573,169 B2 | * | 8/2009 | Ihle et al. | 310/156.21 |
| 7,679,252 B2 | * | 3/2010 | Iwase et al. | 310/156.53 |
| 2002/0125779 A1 | | 9/2002 | Qin et al. | |
| 2004/0051416 A1 | | 3/2004 | Yamada et al. | |
| 2006/0057006 A1 | * | 3/2006 | Williams et al. | 417/423.14 |
| 2007/0182259 A1 | * | 8/2007 | Sakata et al. | 310/90 |
| 2008/0199334 A1 | * | 8/2008 | Sorensen | F04B 17/03 |
| | | | | 417/423.7 |

FOREIGN PATENT DOCUMENTS

| | | | |
|---|---|---|---|
| EP | 1719916 A1 | 11/2006 | |
| JP | 58072692 A | 4/1983 | |
| JP | 2006296125 A | * 10/2006 | 310/156.53 |

* cited by examiner

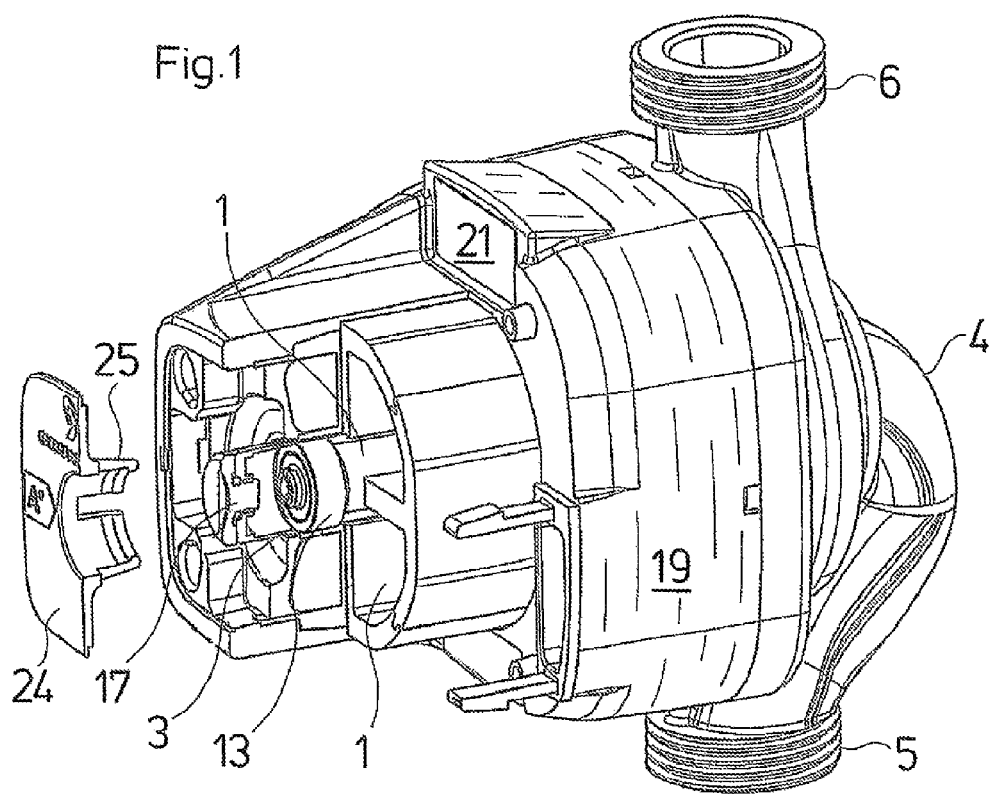
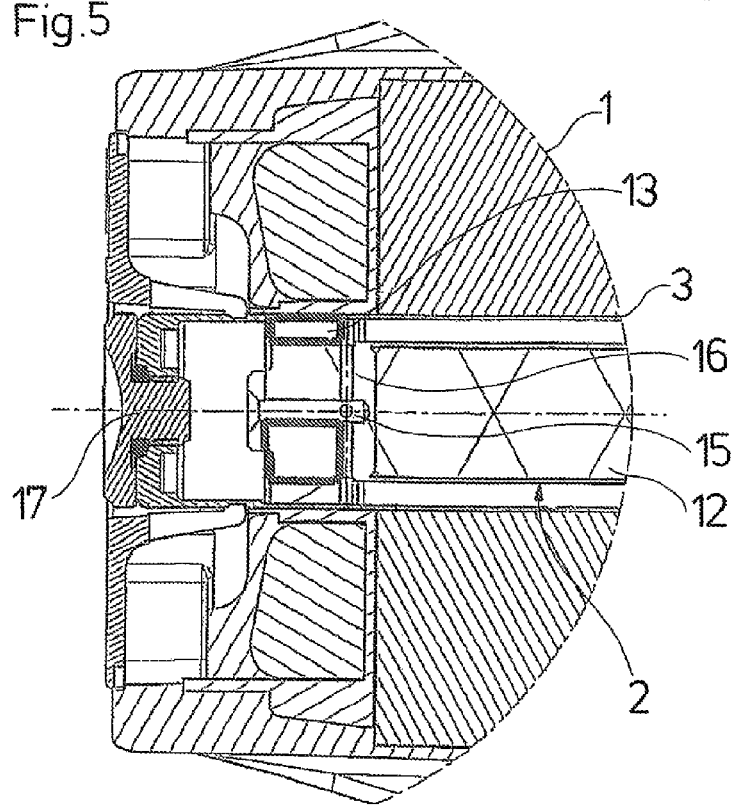

ROTOR FOR A CANNED MOTOR

CROSS-REFERENCE TO RELATED APPLICATIONS

This application is a Section 371 of International Application No. PCT/EP2008/010204, filed Dec. 3, 2008, which was published in the German language on Jun. 25, 2009, under International Publication No. WO 2009/077076 A1 and the disclosure of which is incorporated herein by reference.

BACKGROUND OF THE INVENTION

The present invention relates to a rotor for a canned motor of a wet-running centrifugal pump, according to the features specified in the preamble of the independent claim(s) of the present application.

Wet-running centrifugal pumps are applied in their millions as circulation pumps, for example in heating installations for the circulation of heating water (heating circulation pumps) for circulating utility water (circulation pumps) or in another manner for conveying fluids. It is particularly for pumps of a smaller and medium construction size, which were typically earlier driven by asynchronous motors that one nowadays tends to provide these with permanent magnet motors. Thereby, the permanent magnet or magnets arranged in the rotor must be reliably encapsulated in a fluid-tight manner, since with wet-running centrifugal pumps the motor is surrounded by a fluid, for example water. With known designs, this is typically effected such that the rotor comprises a central shaft which in the region of the stator is surrounded by permanent magnets which are encapsulated in a fluid-tight manner by way of a casing formed of stainless steel. The casing at its seam locations and at the connection location is welded to the shaft, which not only requires effort with regard to manufacturing technology, but could also lead to imbalances, which is disadvantageous, in particular for rotors which are envisaged for higher rotation speeds, as is the case with modern pumps controlled by frequency converter.

BRIEF SUMMARY OF THE INVENTION

Against the above background, it is the object of the present invention to design a rotor according to the preamble, such that the previously mentioned disadvantages are avoided, and that this may in particular be manufactured in an inexpensive manner.

According to the present invention, the above object is achieved by a rotor with the features specified in the independent claim(s) of the present application. Advantageous designs of the present invention are specified in the dependent claims, the subsequent description and the drawing.

The rotor according to the present invention for a canned motor of a wet-running centrifugal pump comprises a shaft for the drive of a pump impeller, is provided with at least one permanent magnet, and comprises an encapsulation which closes in the permanent magnet or magnets in a fluid-tight manner. Thereby, according to the present invention, the rotor is designed such that the peripheral part of the encapsulation, in the region of magnet or magnets, forms the rotor shaft.

This design according to the present invention has the advantage that one may make do without the leading-through of the otherwise usually separate rotor shaft in the region of the permanent magnets, so that in this region too, one may also make do without the connection of the encapsulation to the shaft, which otherwise requires some effort with regard to manufacturing technology. Due to the fact that the encapsulation forms the rotor shaft itself in this region, the remaining inner space may be utilized completely for the incorporation of the permanent magnets. Moreover, the material which is required in any case for the encapsulation of the magnets, is advantageously also used for transmitting the rotor moment. Thereby, the encapsulation material peripheral to the permanent magnet or magnets is utilized typically for forming the rotor shaft, which however does not exclude the encapsulation material on the inner periphery from additionally also co-assuming a shaft function, if for example a central recesses passes through the rotor.

The basic concept of the present invention is thus to do without a separate shaft in the region of the magnet or magnets, and in this region to utilize the encapsulation for the transmission of the torque of the rotor. This may be particularly effected via the peripheral part of the encapsulation, even with a low material thickness of the encapsulation.

According to one advantageous formation of the present invention, the magnet or magnets consist of neodymium, a material which is particularly suitable in an advantageous manner, since on the one hand it displays long-term magnetic stability, and on the other hand it may be introduced into the rotor and not magnetized until afterwards, which is particularly favorable with regard to manufacturing technology.

In a particularly simple design, according to a further formation of the present invention, a shaft section via which the rotor is mounted and at whose free end the impeller is arranged, may connect to the encapsulation. With a suitable design, only this shaft section may connect to the rotor, which has the great advantage that a mounting of the rotor at the end distant to the pump impeller may be done away with, so that the rotor on the one hand may be designed in a cylindrical manner in this end region, and on the other hand may run with a narrow gap in the can, which is advantageous for the efficiency.

However, according to a further formation of the present invention, one may connect shaft sections axially to both sides of the encapsulation, wherein the shaft section distanced to the pump impeller advantageously serves for mounting the rotor in this region.

It is particularly favorable with regard to manufacturing technology, if at least one shaft section is designed as one piece with the peripheral part of the encapsulation. With such a design, this one-piece part is advantageously manufactured of solid material, and the peripheral part of the encapsulation is formed by way of suitable material-removing or erosive machining of the solid material in the region in which the magnet or magnets are to be arranged. Typically, the solid material is created by way of drilling a pocket hole into an end-side of the solid material.

Alternatively or additionally to this, according to the present invention, at least one shaft section may be formed by way of the extension of the peripheral part of the encapsulation, which has the advantage that this may likewise be designed as one piece with the peripheral part of the encapsulation, as well as the further shaft section as the case may be. Thereby, such a rotor may be manufactured of solid material or also from a tube section. Both are particularly favorable for large-scale manufacture.

With such a design, with which a shaft section is formed by the extension of the peripheral part of the encapsulation, advantageously the end-side part of the encapsulation, bearing on the magnet, is connected with material fit to the peripheral part of the encapsulation, for example by way of welding, in particular beam welding. Thus, after joining the magnet or magnets to an end-side, one may introduced an inlay part, which is connected to the part of the encapsulation on the peripheral side with a material fit. This may be advantageously effected by way of beam welding from the outside, through the encapsulation. If such an inlay part is arranged on both sides of the magnet or magnets, which is particularly advantageous, then the rotor may be manufactured of a tube section, which is particularly favorable in large-scale manufacture.

Alternatively, according to a further formation of the present invention, also at least one shaft section may be connected to the peripheral part of the encapsulation with a material fit, so that the encapsulation may be manufactured separately from the shaft section, and is subsequently connected to the shaft section with a material fit, preferably by way of welding, soldering or likewise.

Advantageously, also a shaft section of ceramic material may connect to the typically metallic encapsulation in the previously described manner, wherein this shaft section may be connected with a positive and/or non-positive fit to the encapsulation, for example by way of pressing in a polygonal profile or likewise.

A ceramic shaft section at least in sections may particularly advantageously be provided with a metallic layer, which is connected with a material-fit, preferably by way of welding, to the encapsulation. With such an arrangement, the encapsulation does not necessarily need to be completely peripheral about the magnets, and with this arrangement the encapsulation may be formed at the end-side by the connecting shaft section, which on account of the soldering is connected to the encapsulation in a completely sealed manner. The shaft section thus forms an end-side part of the encapsulation, wherein one must ensure that the shaft section is fluid-tight at least in the region in which it forms one part of the encapsulation. This may be achieved for example by way of vapor-deposition of a metal layer.

The shaft section connecting to the encapsulation is particularly advantageously formed of ceramic material since the shaft may then simultaneously form part of the ceramic radial bearing, with which the rotor is mounted in the can or in the extension of the can. The bearing may also be formed of a different material.

With a design according to the present invention, with which a first bearing seat distanced to the pump impeller, as well as a second bearing seat close to the impeller are provided, and which are preferably both arranged to one side of the region over which the magnet or magnets extend, the region over which the magnet or magnets extend is advantageously designed to have a smaller or the same diameter as the rotor in the region of the second bearing seat. With such an arrangement, the region over which the magnet or magnets extend, may be arranged at one end of the rotor, and the pump impeller at the other end of the rotor, wherein the mounting of the rotor is effected in the region therebetween. Such an arrangement is not only favorable with regard to manufacturing technology, but also creates a simple construction of the can, wherein in particular the part of the can which is important for the efficiency of the motor, as well as the part of the rotor cooperating with this, may be manufactured essentially according to efficiency aspects, without for example an increased wall thickness of the can for attaching a bearing or likewise having to be provided in this region.

An impeller receiver is advantageously provided at the impeller-side end of the rotor for fastening the pump impeller, wherein the rotor at least in the region over which the magnet or magnets extend, has a smaller or equal diameter than in the region of the impeller receiver.

Advantageously, the rotor in the region over which the magnet or magnets extend, has a smaller or equal diameter than in the region of the first bearing seat. With such a design, given a suitable design of the bearing and formation of the can, the rotor may be designed with a diameter which remains the same over essentially its entire length, which is particularly favorable with regard to manufacturing technology, since then the rotor may be manufactured with large-scale manufacture for example by way of centreless grinding in a simple manner and with a high dimensional accuracy. Moreover, this method avoids non-circularities, which is likewise advantageous.

Usefully, the rotor at least in the region of the bearing seats is equipped with a hard layer, in particular if the rotor itself is part of the bearing, which is useful. The rotor may therefore be designed in a strength-increasing manner in this region or over its entire length, be it by way of hardening, coating, quenching and tempering or likewise. The deposition of an abrasive layer by way of flame-coating is particularly advantageous. The end-processing of the rotor may then be effected by way of grinding, preferably with the centreless method, which is particularly inexpensive with large-scale manufacture.

It is particularly with narrow gap widths and the impingement of the can with fluid, that a reliable supply of the bearing arranged at the end of the rotor which is distant to the impeller with fluid may not always be ensured in a reliable manner, which is why it may be useful to provide an additional recess which extends essentially longitudinally through the rotor and via which a bleeding or an initial filling of the can may be effected. Such a recess may be provided by a bleed tube which passes through the magnet and the axial parts of the encapsulation. It is to be understood that the bleed tube is arranged and designed within the rotor, such that the magnet or the magnets are designed in a completely encapsulated manner, i.e. are effectively protected before the entry of fluid.

Advantageously, the rotor according to the present invention is formed of a tube section, since such a tube section is inexpensive in manufacture, entails savings with regard to weight and may have a high dimensionally accuracy. In order for example to fix an O-ring on the rotor, as may for example be useful in the region of a bearing, advantageously at least one groove is provided on the outer periphery of the rotor, in which such an O-ring lies. Such a groove may be manufactured from a tube section in a simple manner by forming the tubes, preferably by rolling, on manufacture of the rotor. Thus, no material-removing manufacture is required. The rolling may be effected in an inexpensive manner without separate chucking of the work piece.

The rotor according to the present invention forms a part of a wet-running centrifugal pump which is driven by a canned motor. Thereby, the rotor and the can are advantageously dimensioned such that the radial distance between the rotor and the can corresponds to the radial thickness of the outer bearing shell for the first bearing seat. With this arrangement therefore, a suitable distance between the rotor and the can results in the region adjacent to the bearing seat, thus where typically the magnet or magnets are seated, and this distance ensures a reliable bleeding and supply of the bearing distant to the pump, with fluid. With such an arrangement, as a rule, one may make do without a central bleed tube in the rotor.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a partly sectioned perspective view of a centrifugal pump assembly with a rotor according to a preferred embodiment of the present invention, FIG. 5 is an enlarged representation of detail V in FIG. 4.

DETAILED DESCRIPTION OF THE INVENTION

Figure 2:
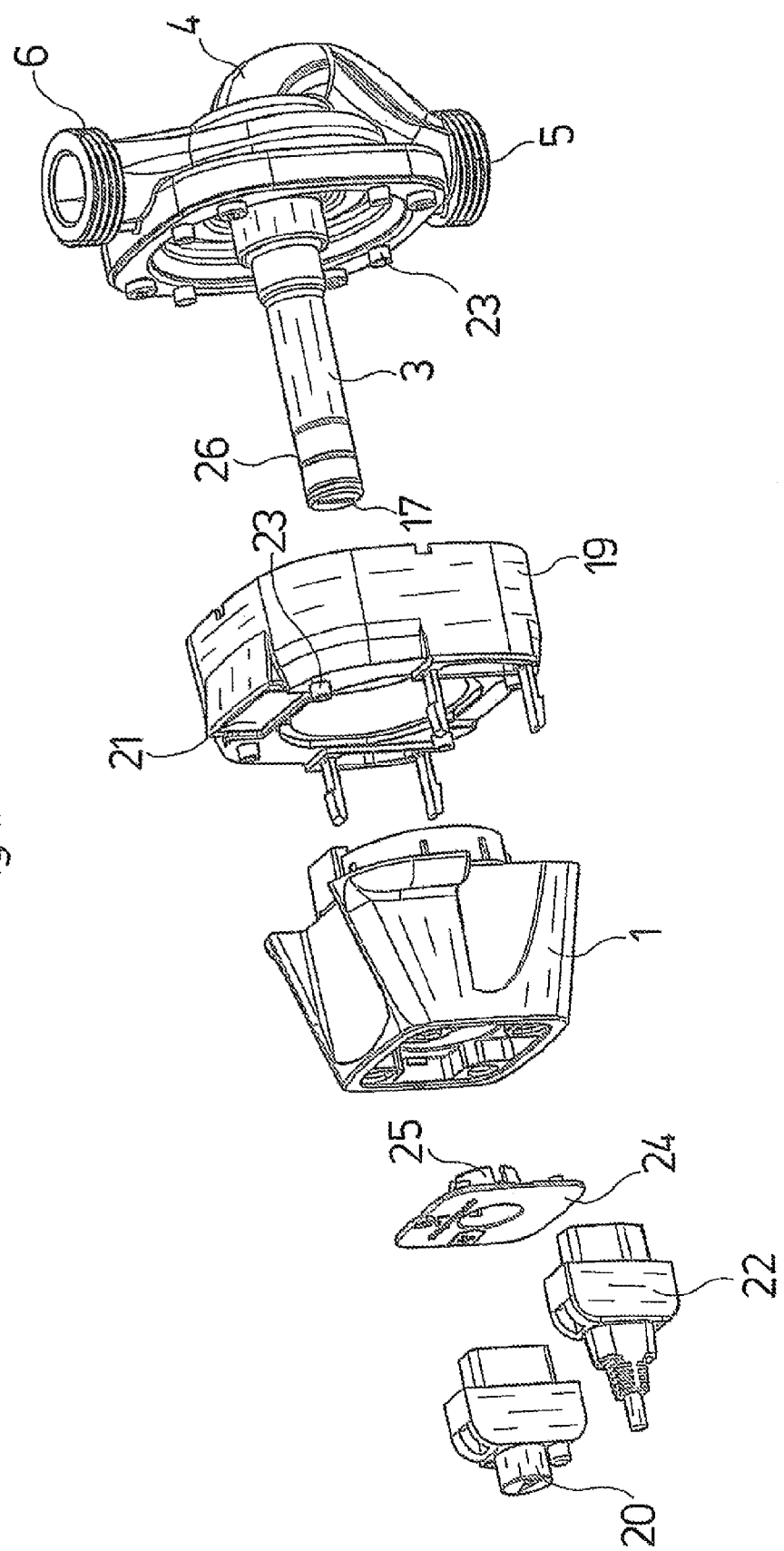
FIG. 2 is an exploded representation of the centrifugal pump assembly according to FIG. 1.

Certain terminology is used in the following description for convenience only and is not limiting. The words "right," "left" and "front" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout the several views, with regard to the pump assembly represented by way of FIGS. 1-7, a wet-running centrifugal pump of the inline construction type is shown, which is driven by an electric motor whose stator 1 is separated from the rotor 2 by a can 3.

The centrifugal pump preferably comprises a pump housing 4 with an inlet connection 5 and an outlet connection 6. A channel within the pump housing 4 runs from the inlet connection 5 to a suction port of an impeller 7, which on the peripheral side is connected via a worm integrated in the pump housing 4, to the outlet connection 6. The impeller 7 is seated on an impeller receiver 8 which is rigidly connected to the rotor 2.

Figure 4:
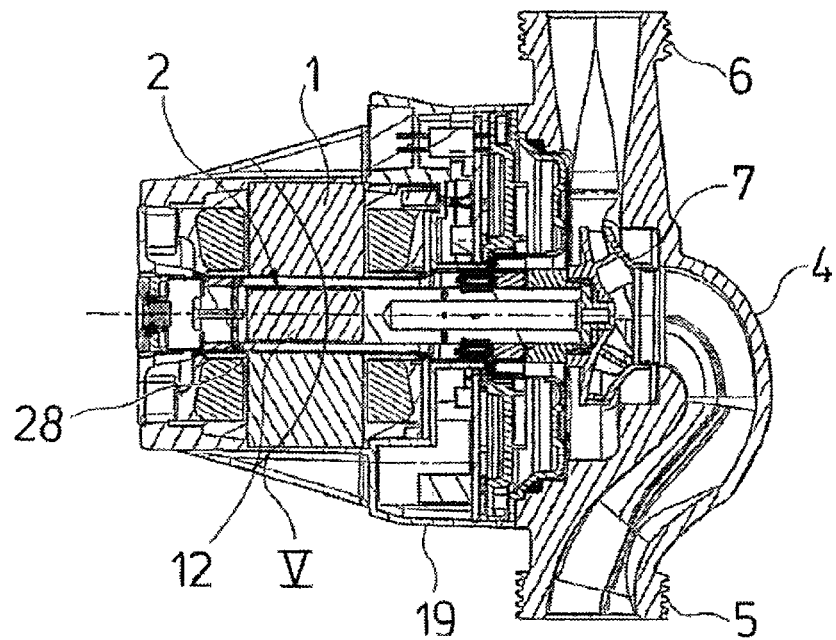
FIG. 4 is a cross-sectional view of the centrifugal pump assembly taken along section line A-A in FIG. 3.
Figure 3:
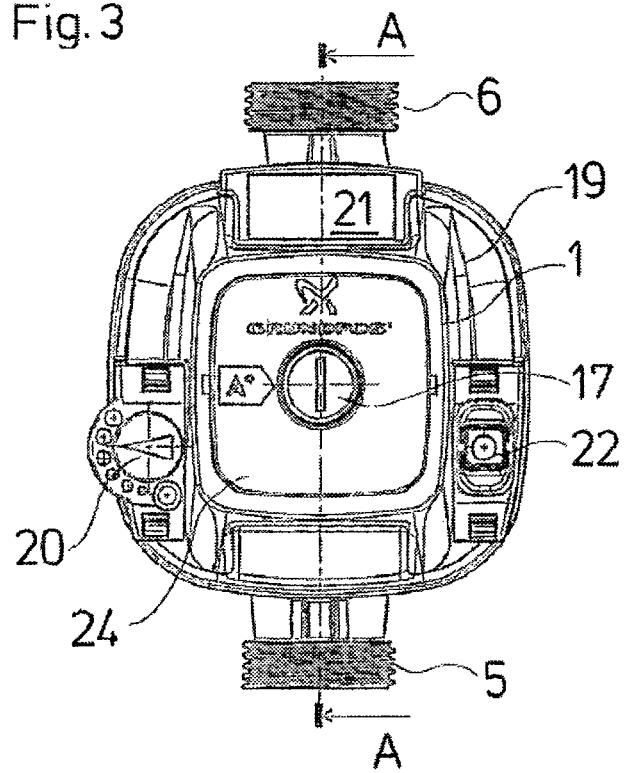
FIG. 3 is a motor side view of the centrifugal pump assembly according to FIG. 1.
Figure 6:
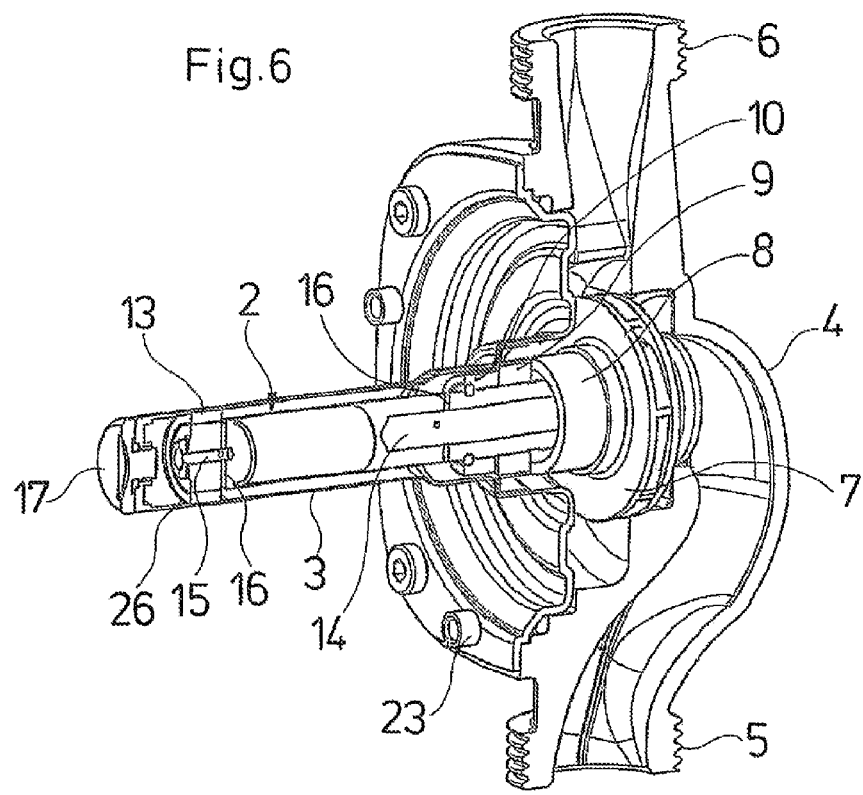
FIG. 6 is a partly section perspective view of the pump with a can without stator and motor electronics.
Figure 7:
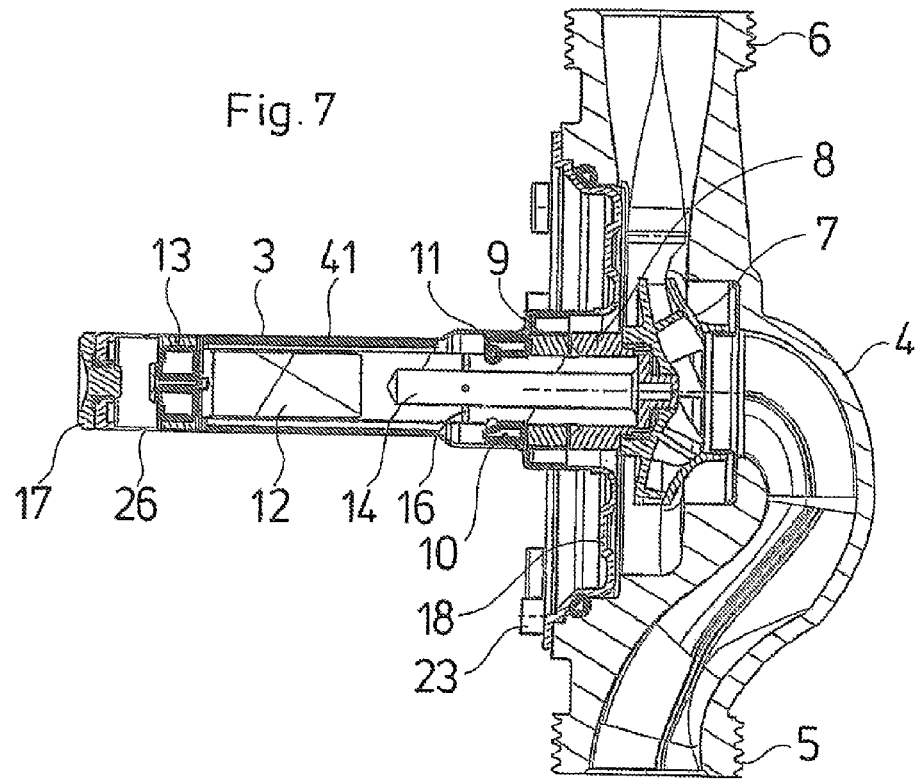
FIG. 7 is a longitudinal section view of the pump according to FIG. 6.

The rotor 2 has, as shown in FIG. 4, a cylindrical, longitudinally extended shape and has a constant diameter over its whole length. The impeller receiver 8 at the end which is directed to the impeller 7 is fastened on the cylindrical part of the rotor 2. A radial bearing connects adjacent to this in the direction of the motor, and an axial bearing connects to this radial bearing. The radial bearing consists of the outer stationary bearing shell 9 which is visible in the section in FIG. 4, and the inner part of the radial bearing is formed by the rotor 1 in this region. The motor-side end-side of the outer bearing shell 9 of the radial bearing simultaneously forms the one bearing surface of the axial bearing, whose other bearing surface is formed by the end-side of the bearing shell 10, which faces the pump, said bearing shell being arranged on the rotor 2 in a rotationally fixed manner. An O-ring 11 is arranged between the bearing shell 10 and the rotor 2, and lies in a groove on the rotor 2 and bears on a chamfer on the motor-side end of the bearing shell 10 and thus holds this on the rotor 2. This axial bearing is provided for accommodating the axial forces which are introduced into the rotor 2 via the impeller 7 on operation of the pump. A further axial bearing is formed between the pump-side end-side of the outer bearing shell 9 of the radial bearing, and the oppositely lying end-side of the impeller receiver 8, and here it is the case of an auxiliary bearing which is not loaded in normal operation.

The rotor 2 which is separated by the can 3 from the remaining part of the motor, in the region of the stator 1 in its inside, comprises permanent magnets 12 which in the manner known per se magnetically cooperate with the stator windings of the stator 1 and via which the torque driving the rotor 2 is produced. The permanent magnets 12 which consist of neodymium, but may also be manufactured of other suitable material, are completely encapsulated, i.e. are enclosed in the rotor 2 in a fluid-tight manner. A further radial bearing is provided on the motor-side end of the rotor 2, and the outer bearing shell 13 if this further radial bearing is integrated in the can 3 and its inner bearing part is formed by the rotor 2 itself.

The rotor 2 comprises a pump-side central channel 14, as well as a motor-side central channel 15, which in each case end at a distance in front of the permanent magnets 12 and in each case have a transverse bore 16 close to this end, which runs in the gap formed between the rotor 2 and the can 3. These channels 14, 15, 16 serve for filling the space surrounding the rotor 2 with delivery fluid, and produce a certain circulation of the delivery fluid within the can 3. Since the can 3 is designed cylindrically in the region of the stator 1, and the outer bearing shell 13 is arranged between the likewise cylindrically designed rotor 2 and the can 3, a gap between the rotor 2 and the inner side of the can 3 and which corresponds roughly to the radial thickness of the outer bearing shell 13 and thus forms sufficient free space for a flow through the can 3, results in the region in which the permanent magnets 12 are arranged as well as beyond this in the direction of the pump. This free space may be undesirably large depending on the radial thickness of the outer bearing shell 13, so that Taylor eddies may form on flowing through, which are undesirable. It may then be useful to provide the can 3 in the region of this free space with a sleeve which reduces the remaining free gap width in its size. Such a sleeve 41 is represented by way of example in FIG. 7, and it is arranged in the region between the bearing shell 13, up to near the region of the can 3 which widens towards the pump. The sleeve 41 consists of a magnetically non-conductive material, e.g. plastic or ceramic. The sleeve 41 for the reduction of the gap width not only prevents an undesired eddy formation in this region, but simultaneously withholds coarse dirt particles from penetrating this region. A channel formed by a deepening may be provided in the inner wall of this sleeve 41, for example by a groove which is arranged helically over the inner periphery and by way of which a targeted leading of the flow through the can 3 around the rotor 2 is effected, and several such channels may also be provided.

This fluid is sucked centrally in the pump impeller 7 through the impeller receiver 8 into the pump-side central channel 14. On rotation of the rotor 2, this fluid is carried through the transverse bore 16 into the previously mentioned gap and thus reaches the bearing on the motor side, where a suitable circulation via the motor-side central channel 15 and the transverse bore 16 is provided. The can which is designed as a canned pot, at the end comprises a closure plug 17 which is accessible from the outside and via which on the one hand a manual bleeding of the can and on the other hand a manual access to the rotor 2 is given, in order for example to set this manually into rotation, should it become blocked.

The rotor 2, whose construction as well as alternative construction is explained in detail further below, has a constant diameter over its entire length up to the impeller receiver 8. The impeller receiver 8 is pressed on, and is thus connected to the rotor 2 and the impeller 7 in a rotationally fixed manner. The permanent magnets 12 which are arranged in the inside of the stator 1 are formed of neodymium, are incorporated in a suitable recess of the rotor 2 and are encapsulated in a fluid-tight manner as well as magnetized after introduction.

The rotor 2, with its radial bearings arranged at both sides of the permanent magnets 12, is mounted in a rotatable manner within the can 3 designed as a canned pot. The can 3 at its end on the pump side comprises a flange-like formation 18, with which it forms the wall of the pump housing which faces the motor and with which it forms an outer fastening flange with which it is screw fastened on the pump housing. Thus, the unit represented by way of FIG. 2 on the right, and consisting of the can 3 with pump housing 4 and the rotor 2 incorporated therein, forms an assembly unit which encases all fluid-leading parts of the pump. An electronics housing 19 as well as the stator 1 is attached onto this assembly unit is the axial direction of the rotor. The electronics housing 19 contains a frequency converter as well as the associated control and regulation electronics and furthermore connections for a rotational speed selection switch 20, a display 21 as well as a mains connection 22, which are led parallel to the stator 1. The electronics housing 19 and the stator 1 are led at the inside through the can 3 and on there outside are led furthermore by way of fixation pins 23 and corresponding, oppositely arranged recesses, which on joining the components, form a positive-fit interconnection between the pump housing 4, the electronics housing 19 and the stator 1 or stator housing, in all directions with the exception of that opposite to the attachment direction. A plate 24 which bears at the end-side on the motor is provided for securing in this direction, and this plate carries the name plate of the motor and comprises an interrupted ring 25 projecting towards the pump and having a peripheral inner bead which may be brought into engagement with a groove 26 near to the motor-side end of the can 3, and thus fixes these components 1 and 19 on the assembly unit which is formed by the can 3, the pump housing 4 and the rotor 2 integrated therein.

With the preferred embodiment represented by way of FIGS. 1-7, the electronics housing 19 and the stator 1 or the stator housing with the stator located therein are designed of two parts, and these may also be designed in the form of a single-part motor housing. The can 3 consists of metal and is likewise designed as one piece up to the flange-like formation 18, but however at its end comprises a closure plug 17 which is accessible from the outside. The mounting of the rotor is effected via two radial bearings to both sides of the permanent magnet 12 in the rotor, as well as close to the pump impeller 7 via an axial bearing as well as an auxiliary bearing.

Figure 8:
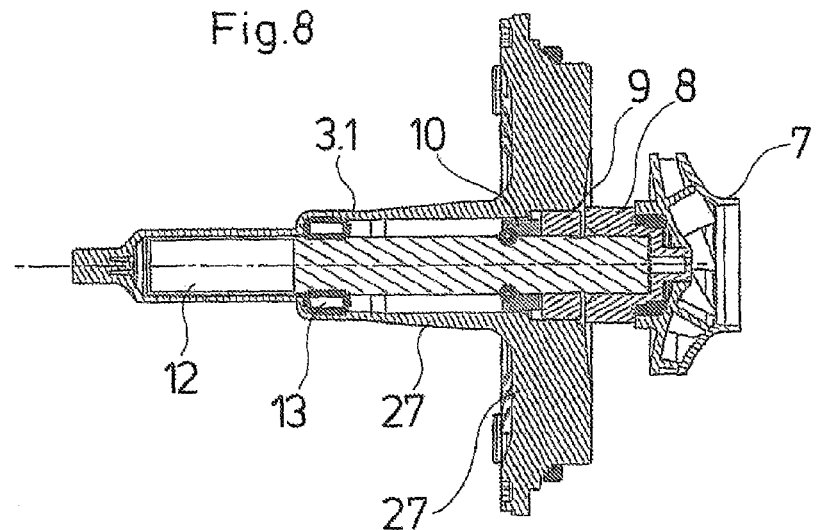
FIG. 8 is a longitudinal section view of an alternative design of the can and rotor.

With the preferred embodiment variant represented by way of FIG. 8, the can 3.1 is formed of plastic and in its region connecting to the pump housing 4, next to the pump wall, further comprises stiffening ribs 27, which are arranged around the impeller axis in a star-like manner and run out in the bearing region which is formed between the actual can and the radial bearing which is adjacent thereto. As the sectioned representation according to FIG. 8 illustrates, the rotor 2.1 there is likewise of a cylindrical shape with the same outer diameter over the entire length, but the permanent magnets 12 there are not arranged between the radial bearings, but on the motor-side end. The mounting of the rotor 2.1 is effected on the other hand opposite the middle region. The outer bearing shell 13 is arranged directly adjacent the region of the permanent magnets 12, and the outer bearing shell 9 and the bearing ring 10 are seated at the same location as with the previously described embodiment variant. The preferred embodiment variant represented by way of FIG. 8 shows a can manufactured of plastic by way of injection molding. It is to be understood that even with this preferred embodiment variant, one may use a can formed of stainless steel sheet metal, wherein the ribs 27 as the case may be, may then be done away with.

Different rotors and different manufacturing methods for such rotors are described by way of FIGS. 9-13. Common to all is the fact that the rotor has no separate shaft but functionally forms such. With all embodiments, the magnets 12 are encapsulated in a completely fluid-tight manner, and thereby at least the peripheral part of the encapsulation, thus the part 28 of the encapsulation, forms a part of the rotor which transmits the produced torque.

Figure 9:
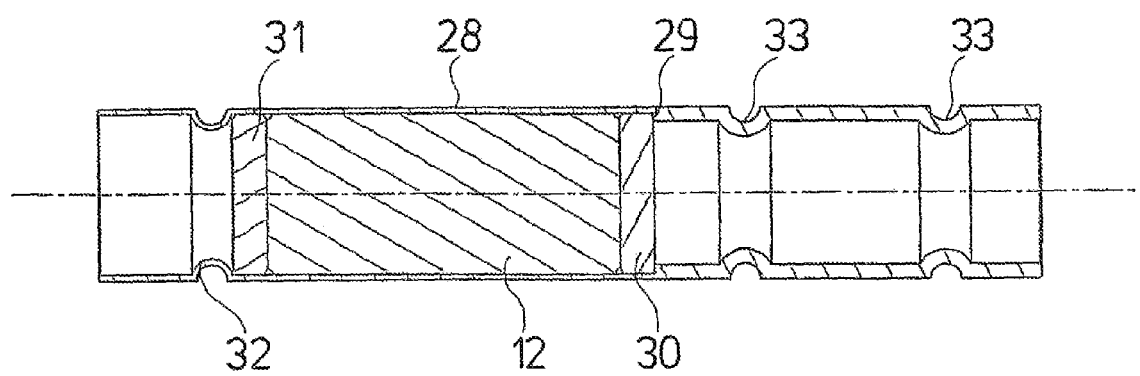
FIGS. 9-13 are longitudinal section views of alternative rotor designs according to the present invention.

The rotor described by way of FIG. 9 consists of a cylinder tube, which in its region carrying the magnets 12 has a smaller wall thickness than in the region therebehind directed in the direction of the impeller receiver 8 (not shown), so that although the same diameter results on the outer side over the whole length with the exception of the embossed grooves, a graduation 29 however results on the inner side. An inlay part 30 which has a cylindrical shape and with its outer periphery corresponds roughly to the inner periphery of the thin-walled tube region, is introduced in the region of this graduation 19, so that this tube region is held in its position with a positive fit by the graduation 29. Connecting thereto, the magnetic or magnetizable material is introduced into the tube, whereupon a further inlay part 31 is introduced, which is designed in the same manner as the inlay part 30. The inlay parts 30 and 31 are welded to the tube in a peripheral manner from the outside by way of beam welding, and thus form the end-side parts of the encapsulations, whose peripheral part is characterized at 28. The groove 32 connecting thereto is embossed by way of deformation of the tube from the outside, just as with the two grooves 33 which are arranged on the other side next to the inlay part 30 and which may for example serve for receiving the O-ring 11. The motor formed in this manner may for example be applied for the embodiment variant described by way of FIGS. 1-7, and may be economically manufactured with large scale manufacture.

Figure 10:
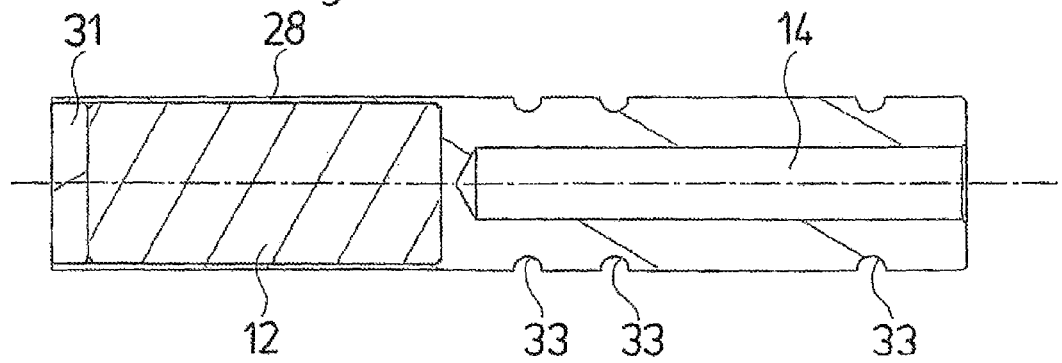

The rotor represented by way of FIG. 10 is manufactured of round material. There, firstly a pocket hole bore has been introduced from the left side in FIG. 10, into which the magnetic or magnetizable material which later forms the magnets 12, as well as subsequently an inlay part 31, have been introduced. The inlay part 31 is welded peripherally, so that an encapsulation results which in the peripheral region surrounding the magnets 12 is formed by the remaining wall material 28, to the side at the left in FIG. 10, is formed by the inlay part 31, and to the other side is formed by the base material. A pocket hole bore as a pump-side central channel 14 is introduced from the other side into the base material. The grooves 33 with this embodiment are formed by way of material removal from the outer periphery of the base material. The rotor described by way of FIG. 10 may for example be applied for the embodiment variants described by way of FIG. 8.

Figure 11:
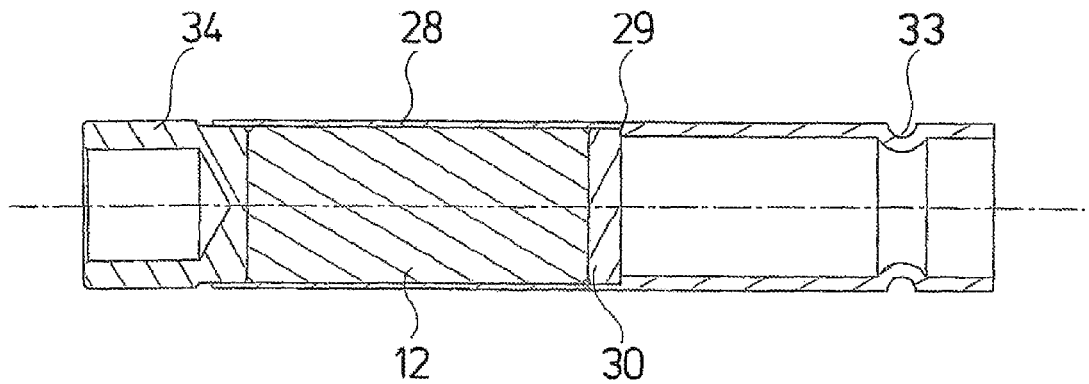

With regard to the rotor represented by way of FIG. 11, a tubular body similar as with that of FIG. 9, may likewise serve as a base material. Here too, an inlay part 30 is arranged in the region of the graduation 29, but the motor-side end of the rotor is not formed by the inlay part 31 but by a shaft section 34, whose outer diameter corresponds to that of the rotor. The shaft section 34 is stepped and with the stepped part is integrated into the base body and is peripherally welded to this. The shaft section 34 may alternatively also consist of a ceramic material. This then in a stepped region in which it engages into the base body, as well as at it end-side facing the magnets 12, is provided with a metal layer by way of vapor deposition, which is soldered at the edge to the base body. If the base material of the shaft section 34 is fluid-tight itself, then one may do away with an end-side metallization.

Figure 12:
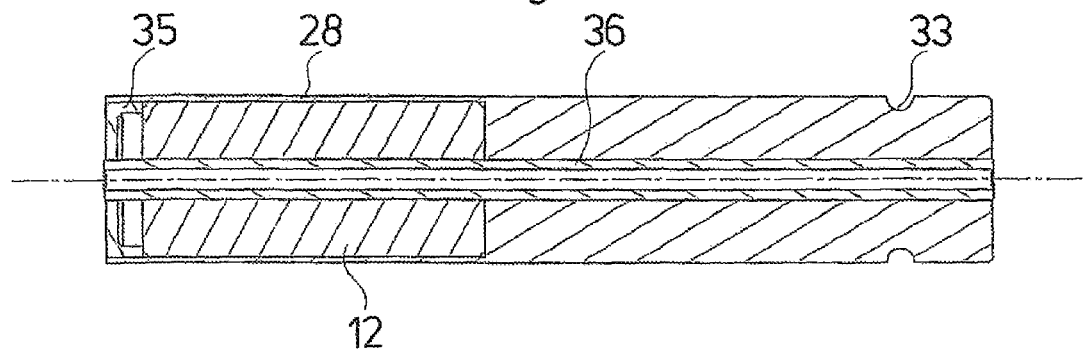

With the preferred embodiment represented by way of FIG. 12, which similarly to FIG. 10 represents a rotor for a mounting, as is described by way of FIG. 8, the rotor is likewise formed from solid material, wherein a recess for the magnets 12 has been incorporated from an end-side, and this recess is closed by an inlay part 35 which closes off the rotor at the end-side in a flush manner and is peripherally connected to the peripheral part 28 by way of welding. For forming a central channel as is described by way of the preferred embodiment example according to FIGS. 1-7, for example by way of channels 14 and 15 in combination with the gap formed therebetween, a central channel is provided there through a tube 36 passing completely through the rotor. The tube 36 at its end-sides is peripherally welded to the base body or peripherally welded to the inlay part 35, so that a complete encapsulation of the magnets 12 is given. This rotor thus permits a leading of fluid through the rotor, thus it may also be applied wherever the gap dimension between the rotor and the can is comparatively small, or contamination of the delivery fluid may not be completely ruled out. Likewise, a part of the torque may be transmitted via the tube 36 which forms part of the encapsulation, depending on the arrangement of the weld locations.

Figure 13:
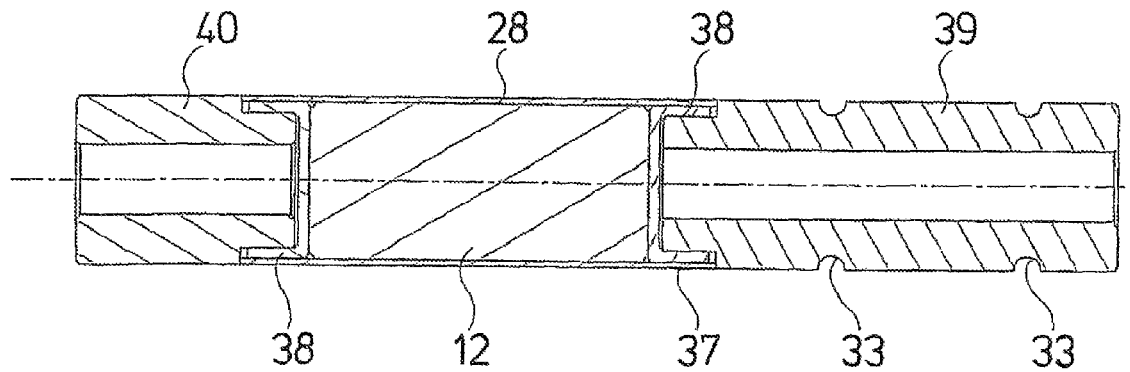

The rotor represented by way of FIG. 13 and which may be applied for the preferred embodiment variants represented by way of FIGS. 1-7, comprises a comparatively thin-walled tube section 37 which forms the peripheral encasing 28 of the permanent magnets 12. Two pot-like inlay parts 38 are integrated in this tube section 37 at the end-side, and these parts are peripherally welded to the tube section 37. These inlay parts 38 in combination with the tube section 37, form the encapsulation for the permanent magnets 12. In each case, a shaft section 39 or a shaft section 40 is arranged connecting to the inlay parts 38 and engaging into these, and this shaft section is likewise designed in a tubular manner. The central channel formed in the shaft sections 39 and 40 is interrupted by the encapsulation of the permanent magnets 12. Here too, suitable transverse bores are provided, as is represented by way of example by way of the transverse bores 16 in the firstly described embodiment example.

The variation of the preferred embodiment forms of the rotor, as has been described by way of example and by way of FIGS. 9-13, represent only a part of the preferred embodiments envisaged according to the invention. Common to all embodiments is however the complete metallic encapsulation of the permanent magnets 12. With the represented embodiments, the rotor furthermore has the same diameter over its entire length, disregarding the grooves. However, particularly for attaching the outer bearing shell 13, the rotor may also be stepped towards the end, so that the gap formed between the can and the rotor in the region of the stator may be designed significantly smaller. The stepped part is then to be machined accordingly. Irrespective of this, the remaining surface of the rotor may be ground in a centreless manner, as the case may be after flame-coating with a hard material.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A wet-running centrifugal pump comprising:
   a can; and
   a rotor received in the can, the rotor having:
   (i) a rotor shaft for the drive of a pump impeller the rotor shaft having a central longitudinal axis, a first shaft section, and an encapsulation, the first shaft section extending along the longitudinal axis and having a free end on which the impeller is arranged, and
   (ii) at least one permanent magnet within the encapsulation of the rotor shaft, the at least one permanent magnet having an axial length, the encapsulation enclosing the at least one permanent magnet in a fluid tight manner,
   wherein along the axial length of the at least one permanent magnet, the rotor shaft is formed only by an outer peripheral part of the encapsulation, the outer peripheral part of the encapsulation being radially spaced apart from the central longitudinal axis by at least a portion of the at least one permanent magnet, the first shaft section being one piece with and formed by an extension of the outer peripheral part of the encapsulation, and
   wherein a diameter of the rotor is essentially the same over an entire length of the rotor, and
   wherein, over the entire length of the rotor, a radial distance between the rotor and the can is at least equal to a radial thickness of an outer bearing shell for a first bearing seat.

2. The wet-running centrifugal pump according to claim 1, wherein the at least one permanent magnet consist of neodymium.

3. The wet-running centrifugal pump according to claim 1, wherein end-side parts of the encapsulation are connected to the outer peripheral part of the encapsulation with a material fit and contact the at least one permanent magnet.

4. The wet-running centrifugal pump according to claim 1, wherein end-side parts of the encapsulation are formed by inlay parts, which are connected to the outer peripheral part of the encapsulation by way of beam welding from the outside.

5. The wet-running centrifugal pump according to claim 1, wherein an additional shaft section of the rotor is connected to the outer peripheral part of the encapsulation with a material fit.

6. The wet-running centrifugal pump according to claim 1, wherein an additional shaft section of the rotor is made of ceramic material, connects to the encapsulation, and is connected to the encapsulation with a non-positive or positive fit.

7. The wet-running centrifugal pump according to claim 6, wherein the ceramic shaft section at least in sections is provided with a metallic layer, which is connected to the encapsulation with a material fit, by way of soldering.

8. The wet-running centrifugal pump according to claim 1, wherein the rotor comprises the first bearing seat which is distanced from the pump impeller, and a second bearing seat which is close to the pump impeller.

9. The wet-running centrifugal pump according to claim 1, wherein an impeller receiver for fastening the pump impeller is provided.

10. The wet-running centrifugal pump according to claim 9, wherein the rotor comprises the first bearing seat which is distanced from the pump impeller, and a second bearing seat which is close to the pump impeller, and at least in the region of the first and second bearing seats and of the impeller receiver, the rotor is coated and is ground in a centerless manner.

* * * * *